(12) United States Patent
Kim et al.

(10) Patent No.: US 12,710,594 B2
(45) Date of Patent: Aug. 18, 2026

(54) LENSED OPTICAL FIBER TAPER AND METHODS OF MANUFACTURING SAME

(71) Applicant: UNIVERSITE LAVAL, Québec (CA)

(72) Inventors: Sanggon Kim, Quebec (CA); Mourad Roudjane, Québec (CA); Younes Messaddeq, Quebec (CA); Yves De Koninck, Québec (CA)

(73) Assignee: UNIVERSITE LAVAL, Quebec (CA)

( * ) Notice: Subject to any disclaimer, the term of this patent is extended or adjusted under 35 U.S.C. 154(b) by 301 days.

(21) Appl. No.: 18/564,166

(22) PCT Filed: May 26, 2022

(86) PCT No.: PCT/CA2022/050846
§ 371 (c)(1),
(2) Date: Nov. 27, 2023

(87) PCT Pub. No.: WO2022/246564
PCT Pub. Date: Dec. 1, 2022

(65) Prior Publication Data

US 2024/0377589 A1 Nov. 14, 2024

Related U.S. Application Data

(60) Provisional application No. 63/193,814, filed on May 27, 2021.

(51) Int. Cl.
*G02B 6/26* (2006.01)
*G02B 6/255* (2006.01)

(52) U.S. Cl.
CPC .......... *G02B 6/262* (2013.01); *G02B 6/2552* (2013.01)

(58) Field of Classification Search
CPC ........ G02B 6/262; G02B 6/2552; G02B 6/32; G02B 6/241; G02B 6/2835
See application file for complete search history.

(56) References Cited

U.S. PATENT DOCUMENTS 4,285,892 A 8/1981 Betsuda et al.
4,469,554 A * 9/1984 Turner .................... C03C 15/00 252/79.3

(Continued)

FOREIGN PATENT DOCUMENTS

WO 2004048285 A1 6/2004

OTHER PUBLICATIONS

Puygranier et al. ("Chemical etching of optical fiber tips—experiment and model", Ultramiscroscopy, vol. 85, Issue 4, Dec. 2000, pp. 235-248) (Year: 2000).*

(Continued)

*Primary Examiner* — Michelle R Connelly
(74) *Attorney, Agent, or Firm* — Reno Lessard; Norton Rose Fulbright Canada LLP

(57) ABSTRACT

There is described a method of manufacturing a lensed optical fiber using an optical fiber having a tapered region decreasing in diameter along a longitudinal direction leading to a taper tip. The method generally has: while the tapered region and the taper tip of the optical fiber are immersed into an etching liquid, heating the etching liquid surrounding the taper tip in accordance with a temperature gradient in which temperature increases longitudinally from the tapered region to the taper tip, said the local heating causing a corresponding etching rate gradient shaping the taper tip into a lens.

11 Claims, 16 Drawing Sheets

(56) References Cited

U.S. PATENT DOCUMENTS

| | | | | |
|---|---|---|---|---|
| 10,398,293 | B2 | 9/2019 | Pisanello et al. | |
| 2004/0134884 | A1* | 7/2004 | Wei | G02B 6/262 216/83 |
| 2005/0150255 | A1* | 7/2005 | Tang | B29C 67/0044 264/1.24 |
| 2006/0042321 | A1* | 3/2006 | Lewis | G02B 6/262 65/378 |

OTHER PUBLICATIONS

Puygranier et al. ("Chemical etching of optical fibre tips _ experiment and model", Ultramicroscopy, vol. 85, Issue 4, Dec. 2000, pp. 235-248) (Year: 2000).*

Sayah et al. ("Optical Fiber Tip Fabricated by Surface Tension Controlled Etching", Conference: 2002 Solid-State, Actuators, and Microsystems Workshop, Hilton Head Island, South Carolina, Jun. 2-6, 2002. (Year: 2002).*

Lambelet et al. ("Chemically etched fiber tips for near-field optical microscopy: a process for smoother tips", Applied Optics, vol. 37, No. 31, Nov. 1, 1998, pp. 7289-7292. (Year: 1998).*

A. Kotsas, H. Ghafouri-Shiraz, T. S. M. Maclean, Microlens fabrication on single-mode fibres for efficient coupling from laser diodes, Optical and Quantum Electronics.

Emara M et al. , A Wireless Head-mountable Device with Tapered Optical Fiber-coupled Laser Diode for Light Delivery in Deep Brain Regions, 2018 IEEE Transactions on Biomedical Engineering.

Ferruccio Pisanello, Gil Mandelbaum, Marco Pisanello, Ian A Oldenburg, Leonardo Sileo, Jeffrey E Markowitz, Ralph E Peterson, Andrea Della Patria, Trevor M Haynes, Mohamed S Emara, Barbara Spagnolo, Sandeep Robert Datta, Massimo De Vittorio, Bernardo L Sabatini, Dynamic illumination of spatially restricted or large brain volumes via a single tapered optical fiber, Jun. 19, 2017, Nature America.

G. Eisnstein et al, Chemically etched conical microlenses for coupling single-mode lasers into single-mode fibers, Applied Optics, vol. 21, Issue 19, pp. 3470-3474 (1982).

Gyeongho Son and Kyoungsik Yu, Radiation from Concave Optical Fiber Tips Fabricated by Laser Induced Photothermal Effects.

Hongbao Xin, Baojun Li, Fiber-based optical trapping and manipulation, Nov. 27, 2017, Springer.

K. Shiraishi et al, Robust Lensed Fibers With High Focusing Power Even in Fluid, International Conference on Electronics Packaging (ICEP), (2014).

K. Shiraishi et al, Single-mode fiber with a plano-convex silicon microlens for an integrated butt-coupling scheme, Applied Optics, vol. 47, Issue 34, pp. 6345-6349 (2008).

Mehran Ahadi, Mourad Roudjane, Marc-André Dugas, Amine Miled, Younès Messaddeq, Wearable Sensor Based on Flexible Sinusoidal Antenna for Strain Sensing Applications, May 27, 2022, MDPI.

Philippe Guay; Stepan Gorgutsa; Sophie LaRochelle; Younes Messaddeq, Wearable Contactless Respiration Sensor Based on Multi-Material Fibers Integrated into Textile, May 6, 2017, MDPI.

Yifan Meng, Siyuan Ma, Zhenjian Zhang, and Wei Hang, 3D Nanoscale Chemical Imaging of Core-Shell Microspheres via Microlensed Fiber Laser Desorption Postionization Mass Spectrometry, Analytical Chemistry 2020 92 (14), 9916-9921.

Yifan Meng, Xiaoling Cheng, Tongtong Wang, Wei Hang, Xiaoping Li, Wan Nie, Rong Liu, Zheng Lin, Le Hang, Zhibin Yin, Baolin Zhang, and Xiaomei Yan, Micro-Lensed Fiber Laser Desorption Mass Spectrometry Imaging Reveals Subcellular Distribution of Drugs within Single Cells, Angew. Chem. Int. Ed. 2020, 59, 17864-17871.

* cited by examiner 100
102
104
106
108
110
112
112a
112b
D1
D2
α
β

302
318
306
322,B
308
310,310a
316
320,A 318a
318
321
321
304
306
308
316

304
306
308
314
302

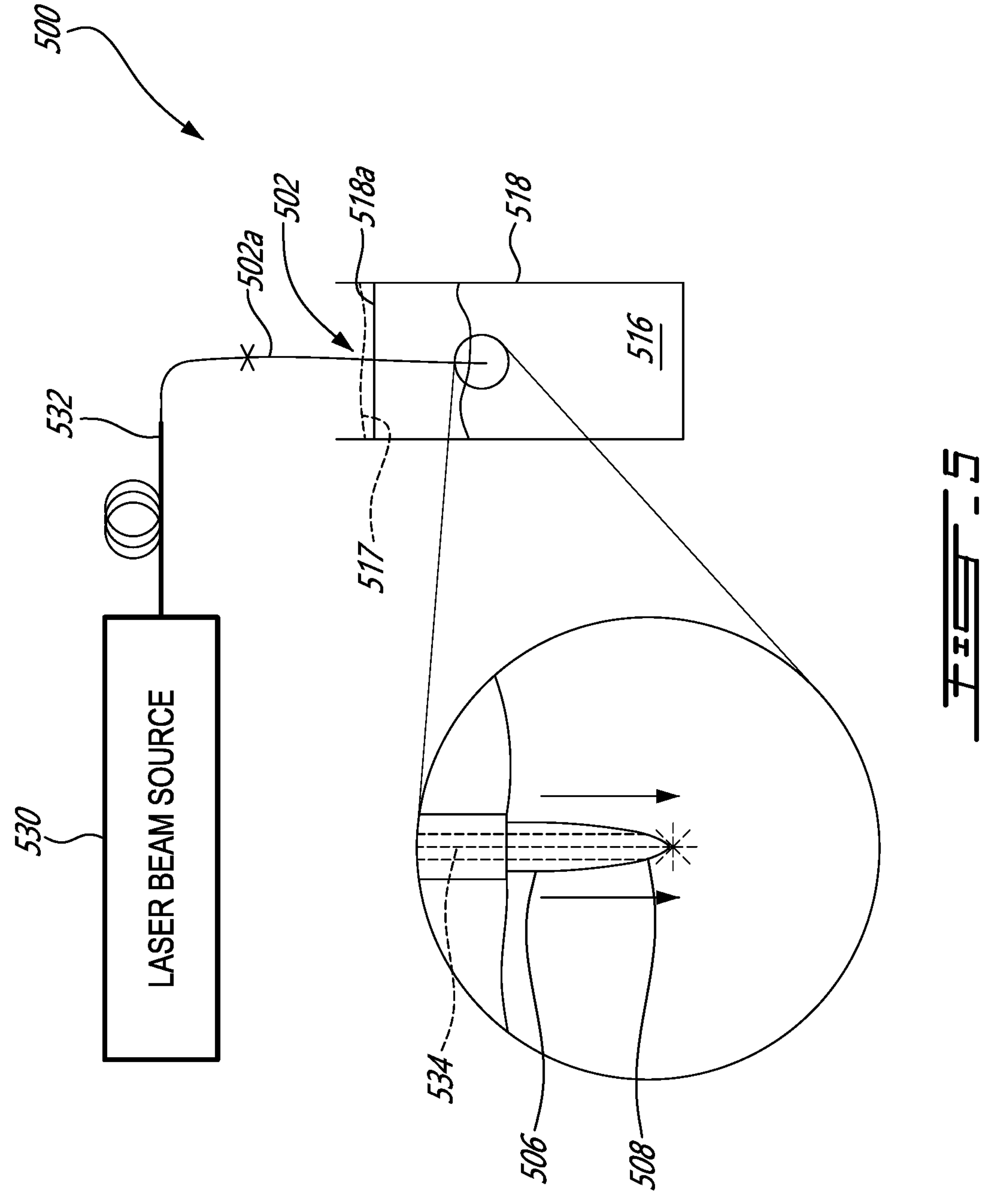
500
502a
502
518a
518
516
532
517
530
LASER BEAM SOURCE
534
506
508

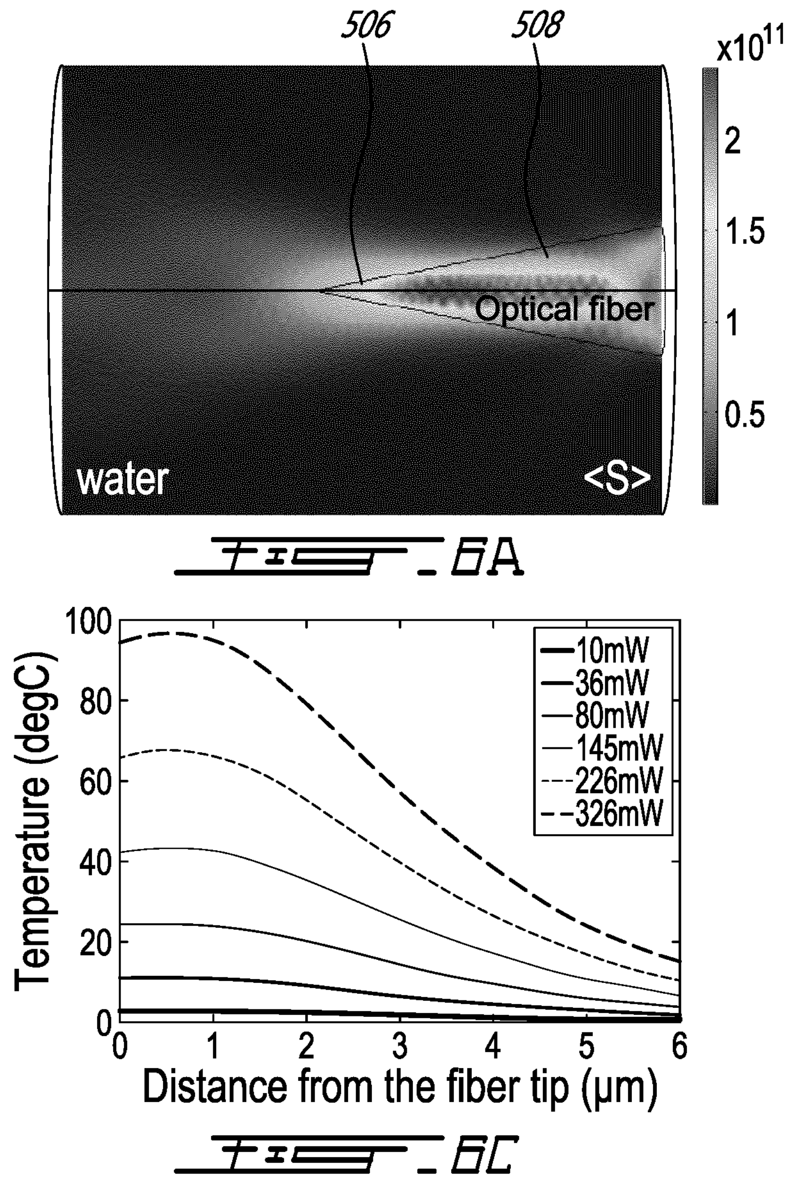
FIG. 6A
FIG. 6C
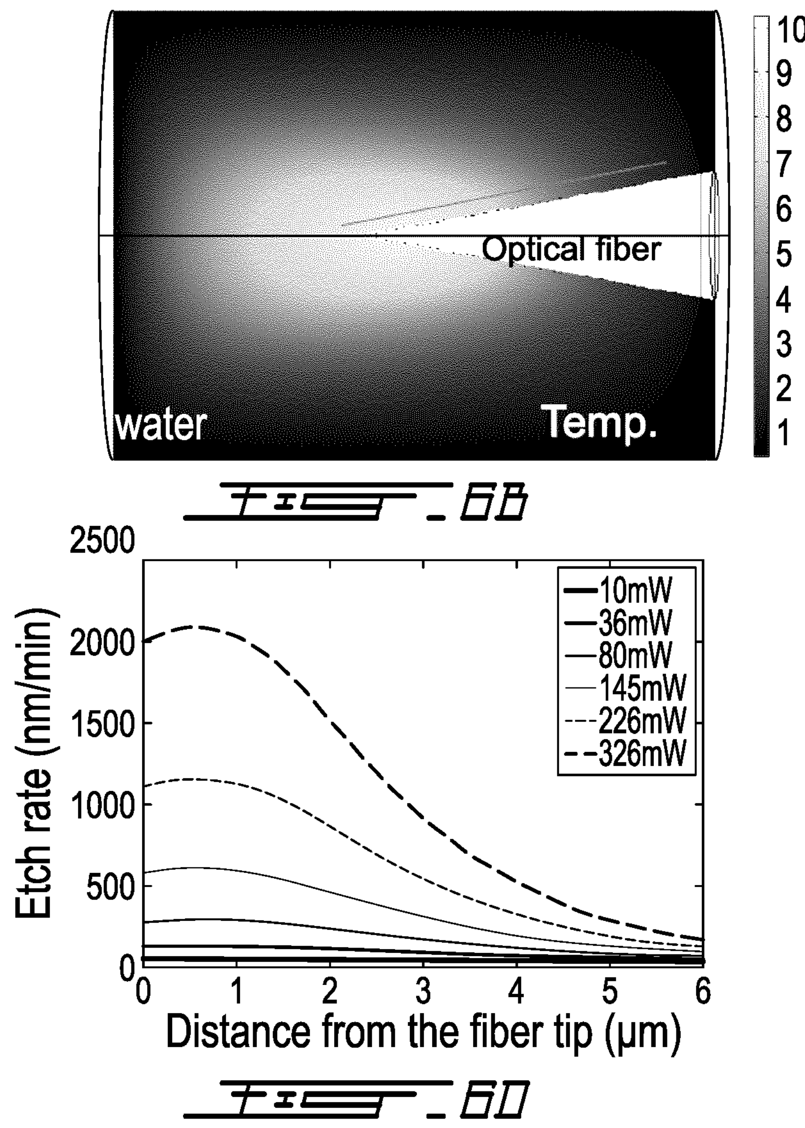
FIG. 6B
FIG. 6D

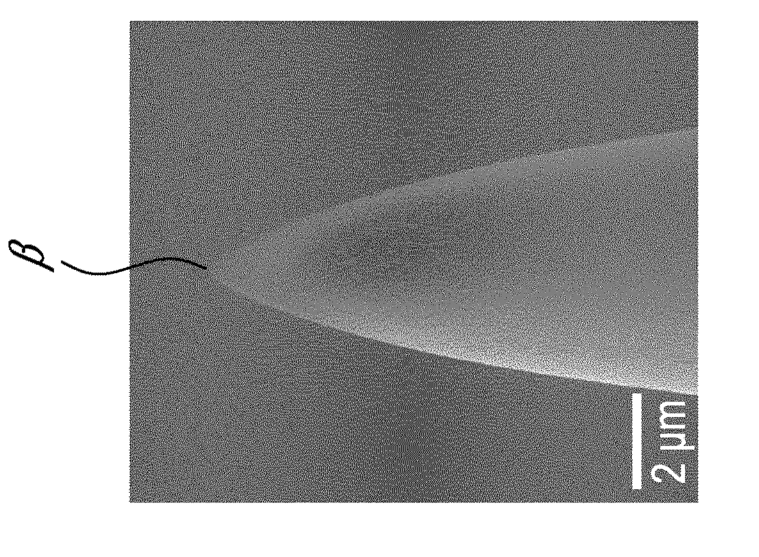
FIG. 7C
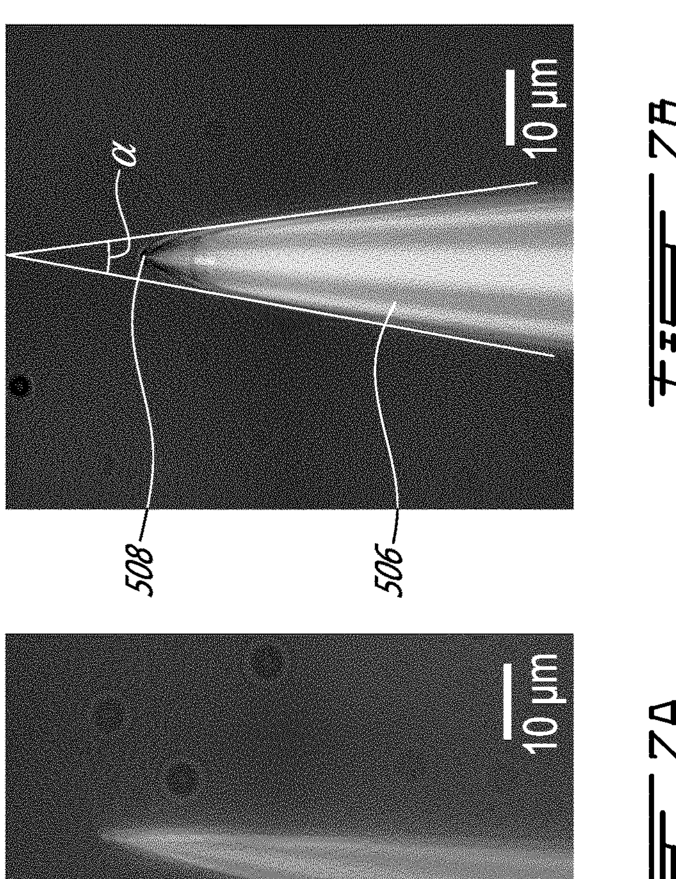
FIG. 7B
FIG. 7A

1200
LASER BEAM SOURCE

1300
LOCALIZED HEATING SOURCE

1604
P
1602
1600

LENSED OPTICAL FIBER TAPER AND METHODS OF MANUFACTURING SAME

FIELD

The improvements generally relate to the manufacturing of a lensed optical fiber and more particularly relate to the manufacturing of a lens at a tip of a tapered optical fiber.

BACKGROUND

An optical fiber is generally used as a means to transmit light between its two ends. It is known that light outputted at a flat-cleaved end will come out as diverging. In some applications, the divergence of the exiting light is undesirable as converging light is preferred. In these applications, the end of the optical fiber is shaped to form a lens changing a beam profile of the light exiting the optical fiber. To do so, one technique involves shaping the end of the optical fiber by mechanically grinding it using high-precision machining. In applications where a lensed optical fiber tip with a reduced dimension is sought, another technique involves heating and stretching an optical fiber to form a tapered optical fiber, cutting it in half, and melting a tip of one of the resulting optical fiber tapers to create a rounded bulge-shape lens at the tip. Although existing techniques to manufacture lensed optical fibers are satisfactory to a certain degree, there remains room for improvement, especially in enhancing reproducibility and scalability while reducing manufacturing costs.

SUMMARY

In a first aspect of the present disclosure, there is provided a method of manufacturing a lensed optical fiber using an optical fiber having a tapered region decreasing in diameter along a longitudinal direction leading to a taper tip, the method comprising: while the tapered region and the taper tip of the optical fiber are immersed into an etching liquid, heating the etching liquid surrounding the taper tip in accordance with a temperature gradient in which temperature increases longitudinally from the tapered region to the taper tip, said heating causing a corresponding etching rate gradient shaping the taper tip into a lens.

It was found that by inducing such a temperature gradient within the etching liquid, the etching liquid would in turn exhibit a corresponding etching rate gradient in which the etching rate increases longitudinally from the tapered region to the taper tip. By immersing the tapered optical fiber in the etching liquid in a way that the taper tip lies in a region of higher etching rate and the remaining tapered region lies in a region of lower etching rate, it was found that the etching liquid can etch the tapered optical fiber with an aggressiveness increasing from the tapered region to the taper tip, culminating in rounding or otherwise shaping the taper tip to form a lens.

Further in accordance with the first aspect of the present disclosure, wherein the etching liquid can for example absorb light within an absorption spectral range, said heating being performed using a laser beam having optical energy distributed at least partially in the absorption spectral range of the etching liquid.

Still further in accordance with the first aspect of the present disclosure, said heating can for example include injecting the laser beam within the optical fiber, and propagating the laser beam along the longitudinal orientation towards the taper tip.

Still further in accordance with the first aspect of the present disclosure, the method can for example further include increasing a laser power of the laser beam over a given laser power threshold, the laser power threshold being associated to at least one of an etched taper angle and an etched tip radius.

Still further in accordance with the first aspect of the present disclosure, the etching liquid can for example include hydrofluoric acid and the laser beam is a near-infrared laser beam.

Still further in accordance with the first aspect of the present disclosure, the lens can for example have an etched taper angle below about 10 degrees, preferably below about 3 degrees, and an etched tip radius below about 10 microns, preferably below about 3 microns.

Still further in accordance with the first aspect of the present disclosure, said etching can for example include rounding the taper tip to form a rounded tip.

Still further in accordance with the first aspect of the present disclosure, the tapered region can for example have in succession at least a first tapered region, a second tapered region extending from the first tapered region, and the taper tip, said heating including heating at least the second tapered region and the taper tip.

Still further in accordance with the first aspect of the present disclosure, said first tapered region can for example have a greater taper angle than a taper angle of the second tapered region.

In a second aspect of the present disclosure, there is provided a lensed optical fiber taper comprising: a length of optical fiber having in succession an optical fiber body, a tapered region extending from the optical fiber body, and a rounded tip terminating the tapered region, the tapered region decreasing in diameter from a first diameter proximate the optical fiber body and a second diameter proximate the rounded tip, the tapered region having a taper angle below about 3 degrees and the rounded tip having a tip radius below about 3 microns, the rounded tip acting as a lens.

Further in accordance with the second aspect of the present disclosure, the lens can for example have a focusing lens focusing the light beam towards a point spaced away from the rounded tip.

Still further in accordance with the second aspect of the present disclosure, the rounded tip can for example be one of hemispherical, parabolic and hyperbolic in shape.

Still further in accordance with the second aspect of the present disclosure, the tapered region can for example have at least a first tapered region extending from the optical fiber body and a second tapered region extending from the first tapered region and terminating in the rounded tip, the first tapered region having a taper angle exceeding about 3 degrees.

Still further in accordance with the second aspect of the present disclosure, the rounded tip can for example be bulge-less.

Still further in accordance with the second aspect of the present disclosure, the lensed optical fiber taper can for example further comprise a shoulder between the optical fiber body and the etched tapered region.

Still further in accordance with the second aspect of the present disclosure, the lensed optical fiber taper can for example further comprise at least a discernable and continuous interface between a core of the optical fiber and a cladding surrounding the core of the optical fiber.

Still further in accordance with the second aspect of the present disclosure, a center region of the rounded tip can for example have a refractive index substantially corresponding to a refractive index of a core of the optical fiber.

Still further in accordance with the second aspect of the present disclosure, the optical fiber can for example be made of one of a silica-based glass and a low phonon energy glass.

In a third aspect of the present disclosure, there is provided a method of manufacturing a lensed optical fiber, the method comprising: providing an optical fiber having a tapered region decreasing in diameter along a longitudinal direction and leading to a taper tip; and while the tapered region and the taper tip of the optical fiber are immersed into an etching liquid, heating the etching liquid surrounding the taper tip in accordance with a temperature gradient in which temperature increases longitudinally from the tapered region to the taper tip.

In this disclosure, the terms "tapered optical fiber," "optical fiber taper" and "taper" are meant to encompass any optical fiber tapering in diameter from a body of the optical fiber to a tip thereof. In other words, the optical fiber body has a diameter which decreases in a direction towards the tip. Such tapered optical fibers or tapers can be obtained for instance by performing heating and pulling techniques, chemical etching techniques, mechanical grinding techniques, and the like.

In this disclosure, the term "taper angle" is meant to encompass any apex angle of a cone surrounding outer surfaces of the tapered region of the lensed optical fiber taper. In other words, the taper angle can be defined as two times the slant angle formed between a longitudinal axis of the lensed optical fiber taper and the outer surface of the tapered region.

In this disclosure, the term "tip radius" is meant to encompass any radius of curvature associated to the rounded tip of the lensed optical fiber taper, or apex thereof. The shape of the rounded tip can be hemispherical, parabolic, hyperbolic, and the like.

In this disclosure, the expression "low phonon energy glass" is intended to encompass any glass having a maximum phonon energy lower than the phonon energy of silica-based glass, i.e., lower than 800 $cm^{-1}$. Fibers made of a low phonon energy glass generally have a transmittance window ranging in the mid-infrared (i.e., 2.5 μm to longer wavelengths), unlike fibers made of a high phonon energy glass, such as a silica-based glass, which rather exhibits a transmittance window only in a given portion of the near-infrared (e.g., up to 2.4 pm). Examples of low phonon energy glass include fluoride-, chalcogenide-, chalcohalide- or telluride-based glass. In some circumstances, even some oxide glasses (e.g., tellurite-based glass) can be considered as a low phonon energy glass. For instance, in some embodiments, the low phonon energy glass is a zirconium fluoride glass having a composition including $ZrF_4$ such as ZBLAN ($ZrF_4$/$HfF_4$, $BaF_2$, $LaF_3$, NaF, and $AlF_3$). In some other embodiments, the low phonon energy glass is an indium fluoride glass having a composition including $InF_3$. In alternate embodiments, the low phonon energy glass is an aluminum fluoride glass having a composition including $AlF_3$. In further embodiments, the low phonon energy glass is a chalcogenide glass having a composition including $As_2S_3$, $As_2Se_3$, AsTe, AsSSe, AsSTe, GaLaS, GeAsS, GeAsSe or the like. Any other suitable low phonon energy glass having a transmittance window in the mid-infrared can be used.

Many further features and combinations thereof concerning the present improvements will appear to those skilled in the art following a reading of the instant disclosure.

DESCRIPTION OF THE FIGURES

In the figures,

FIG. 5 is a schematic view of an example of a system for manufacturing a lensed optical fiber, showing a laser beam source having a beam delivery cable connected at an end of a tapered optical fiber, in accordance with one or more embodiments;

FIG. 6A is an example graph showing energy absorbed by water at a fiber tip when an electromagnetic wave is propagated therein, in accordance with one or more embodiments;

FIG. 6B is an example graph showing temperature distribution in a liquid surrounding the tapered optical fiber of FIG. 6A, in accordance with one or more embodiments;

FIG. 6C is an example graph showing temperature increase as a function of the distance from the taper tip for different laser power values, in accordance with one or more embodiments;

FIG. 6D is an example graph showing etching rate variation as a function of the distance from the taper tip for different laser power values, in accordance with one or more embodiments;

FIG. 7A is an optical image of a taper tip of a tapered optical fiber, in accordance with one or more embodiments;

FIG. 7B is a scanning electron microscopy image of a rounded tip of a lensed optical fiber taper, in accordance with one or more embodiments;

FIG. 7C is an enlarged view of the scanning electron microscopy image of FIG. 7B, in accordance with one or more embodiments;

DETAILED DESCRIPTION

Figure 1:
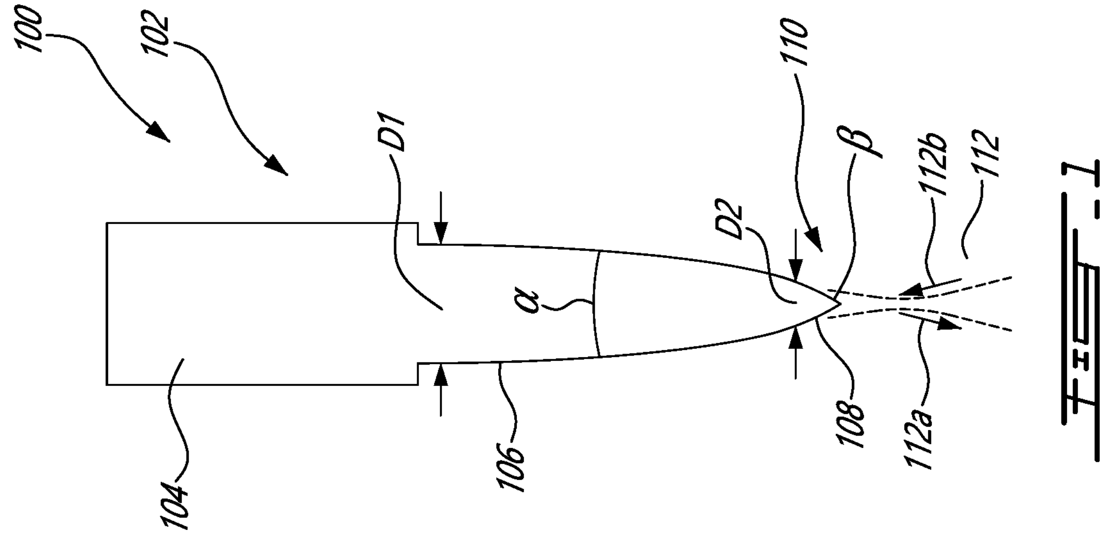
FIG. 1 is a side schematic view of an example of a lensed optical fiber taper, in accordance with one or more embodiments.

FIG. 1 shows an example of a lensed optical fiber taper 100, in accordance with some embodiments. As depicted, the lensed optical fiber taper 100 has a length of optical fiber 102. The length of optical fiber 102 has in succession an optical fiber body 104, a tapered region 106 extending from the optical fiber body 104, and a rounded tip 108 terminating the tapered region 106. It is noted that the shape of the rounded tip can be hemispherical, parabolic, hyperbolic, and the like, depending on the embodiment. The tapered region 106 is such that it decreases in diameter from a first diameter D1 proximate to the optical fiber body 104 to a second diameter D2 proximate the rounded tip 108. As shown in this specific embodiment, the decrease in diameter is continuous and bulge less. The tapered region 106 has a taper angle $\alpha$ down to about 3 degrees and the rounded tip 108 has a tip radius $\beta$ down to about 1 micron. It is intended that the rounded tip 108 acts as a lens 110 outputting or receiving light 112. The lens 110 can focus or otherwise shape an outgoing light beam 112*a*, receive an incoming light beam 112*b* to inject it into the tapered region 106 to be propagated along the optical fiber body 104, simultaneously or sequentially, depending on the embodiment.

Figure 2:
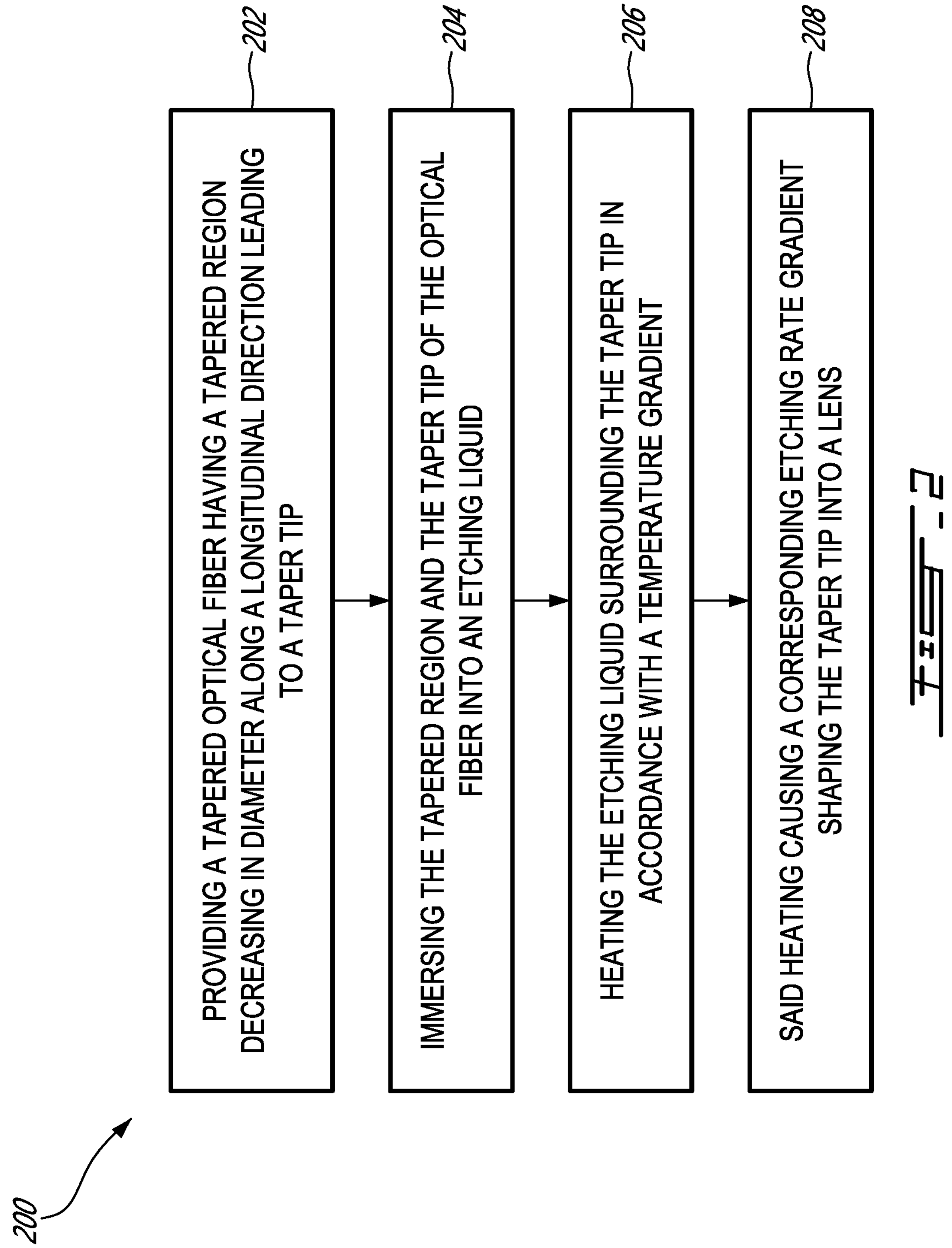
FIG. 2 is a flow chart of an example of a method of manufacturing a lensed optical fiber, in accordance with one or more embodiments.

FIG. 2 shows an example of a method 200 of manufacturing a lensed optical fiber such as the one shown in FIG. 1. The method 200 is described with reference to FIGS. 3A, 3B and 3C which schematically illustrate the sequence of method steps. It is noted that the method 200 is advantageous over existing lensed optical fiber manufacturing techniques in that it is a straightforward and less costly manufacturing technique. In some embodiments, the method 200 can even reach taper angles and tip radii which can't be reached with the existing techniques. For instance, the method 200 can be used to manufacture a lensed optical fiber taper with a taper angle below 3 degrees and with a tip radius below 3 microns.

Figures 3A, 3B, 3C:
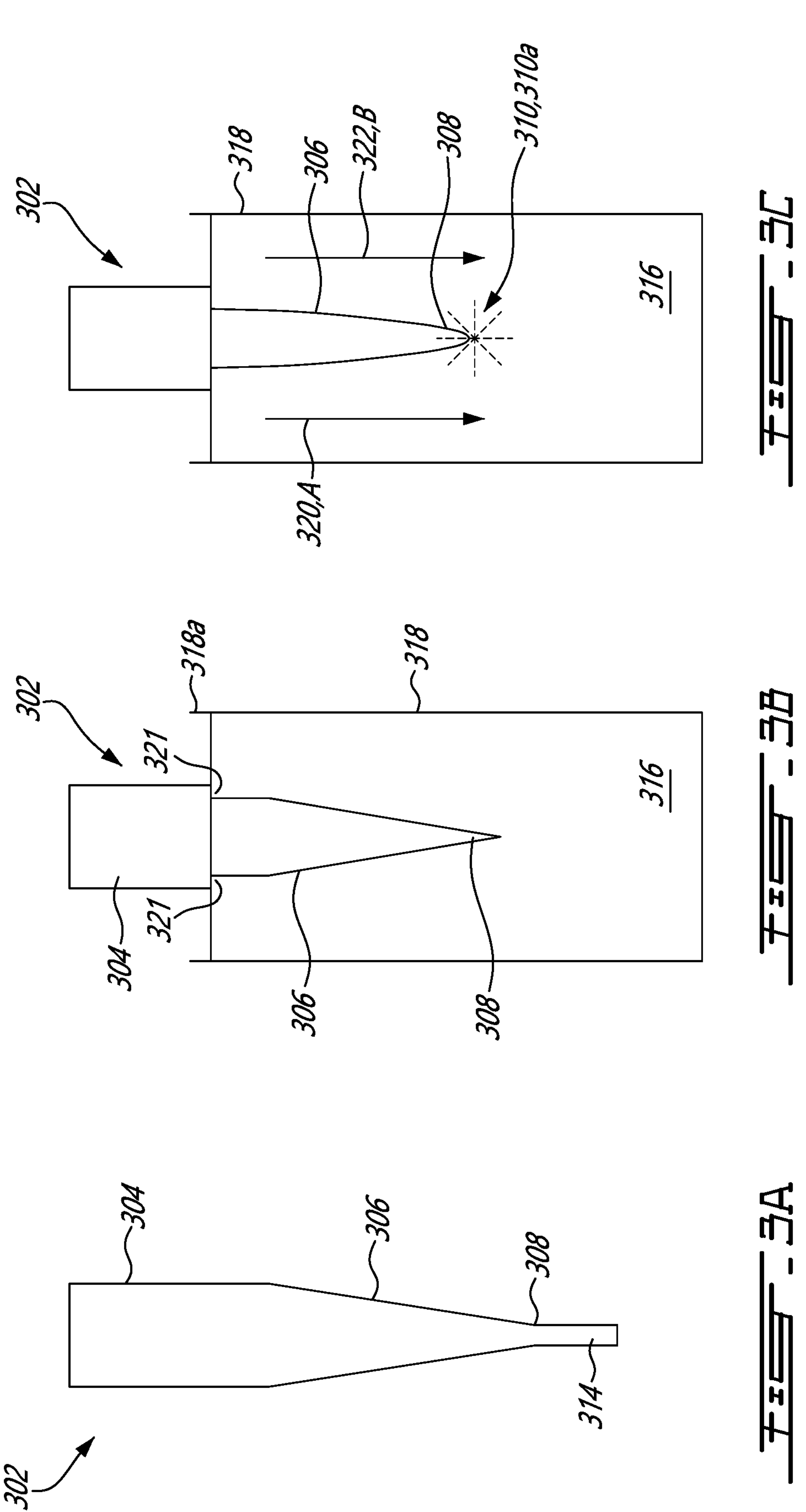
FIG. 3A is a side schematic view of an example of a tapered optical fiber having a tapered region and a taper tip, in accordance with one or more embodiments.
FIG. 3B is a side schematic view of the tapered optical fiber of FIG. 3A immersed into an etching liquid, in accordance with one or more embodiments.
FIG. 3C is a side schematic view of the tapered optical fiber of FIG. 3B heated in accordance with a temperature gradient, in accordance with one or more embodiments.

At step 202, there is provided an optical fiber having a tapered region decreasing in diameter along a longitudinal direction leading to a taper tip. In some embodiments, the optical fiber is heated and stretched to form a tapered optical fiber. The tapered optical fiber may be cut in half to provide two optical fiber tapers each having a corresponding tapered region and a corresponding taper tip. Depending on the embodiment, the optical fiber provided at step 200 can be a tapered optical fiber cut anywhere along its length, a tapered optical fiber, or any optical fiber having in succession at least a tapered region and a taper tip. In some embodiments, the tapered optical fiber can be prepared by etching liquid. The taper angle can be controlled by moving either the fiber or etching liquid vertically during the etching. FIG. 3A shows an example of such an optical fiber 302. As shown, the optical fiber 302 has in succession an optical fiber body 304, a tapered region 306, and a taper tip 308. In this specific embodiment, a waist region 314 follows the taper tip. In some embodiments, the waist region 314 can have another tapered region of increasing diameter. The waist region 314 can extend to a few mm or have another tapered region at the other end depending on the embodiment. In some other embodiments, the waist region 314 can be omitted. In these embodiments, the tapered region is succeeded into the sharp tip without the waist region. The tapered optical fiber can be obtained using more than one technique. In one example technique, a portion of an optical fiber is heated and the ends of the optical fiber are pulled apart from one another, thereby tapering the heated portion. Then, the tapered region can be broken to form two optical fiber tapers. In another example technique, an optical fiber is immersed into an etching liquid and the fiber is pulled out or the etching liquid is lowered slowly. As a result, the immersed portion of the optical fiber may taper to produce the tapered optical fiber. In such a case, either a tapered optical fiber with a flat tip or a sharp fiber tip can be obtained depending on the etching time and for the latter one, the sharpening process in the following step 204 may not be necessary. The etching technique may be preferred in embodiments where the dimension of the core of the optical fiber is to be preserved. Other tapering techniques may be used in other embodiments.

At step 204, as shown in FIG. 3B, the tapered region 306 and the taper tip 308 of the optical fiber 302 are immersed into an etching liquid 316. Examples of such etching liquids can include, but are not limited, to a solution containing hydrofluoric (HF) acid, hexafluorosilicic acid, hydrochloric acid, citric acid and any other suitable optical fiber etching liquid. In some embodiments, the etching liquid is a solution containing an acid diluted into water. In some embodiments, the etching liquid 316 is received into a container 318 having an open end 318*a* through which the tapered region 306 and the taper tip 308 are dipped to a given depth within the container 318. The container 318 may be fixed, with the optical fiber 302 being lowered into the container 318 for the immersion. However, the optical fiber 302 can have a fixed position, with the open top container 318 being raised for the immersion. In some other embodiments, the tapered region and the taper tip are deposited in a longitudinal trench or container filled with the etching liquid. It is understood that the immersion of a portion of the optical fiber into the etching liquid may etch the immersed optical fiber at a given constant etching rate. In some embodiments, especially those in which the optical fiber is provided with a waist portion or another tapered region of increasing diameter, the etching liquid can chemically grind the waist portion until it etches away from the taper tip. As shown in FIG. 3B, the waist portion 314, after a given period of time of immersion into the etching liquid 316, is freed from the taper tip 308 from the waist region 314. The etching step may form a shoulder 321 located between the immersed portion of the optical fiber body 304 and the dry portion of the optical fiber body 304.

At step 206, and referring now to FIG. 3C, the etching liquid 316 surrounding at least the taper tip 308 is heated in accordance with a temperature gradient 320 in which temperature increases longitudinally from the tapered region 306 to the taper tip 308. The local heating can be localized around the taper tip 308 in more than one manner. For instance, in some embodiments, a laser beam is injected at a distal end of the optical fiber 302 and propagated along the longitudinal orientation of the optical fiber and towards the taper tip 308. In such embodiments, the taper tip 308 tends to gradually focus the laser beam causing a localized temperature increase causing the temperature gradient 320. It is envisaged that the etching liquid absorbs light within its absorption spectral range, and that the laser beam used for the heating step 206 has optical energy distributed at least partially in the absorption spectral range of the etching liquid. Accordingly, optical energy of the laser beam can effectively be used to heat some or all of the liquid constituents of the etching liquid. As such, the laser beam is at least partially absorbed by the etching liquid and/or by water molecules present within the etching liquid, thereby increasing its temperature. In embodiments where the etching liquid includes dilute hydrofluoric acid, it was found convenient to use a near-infrared laser beam, especially near 1550 nm wavelength. However, any other etching liquid and laser beam combination can be used if the liquid has a substantial absorption spectrum at the wavelength of the laser or the laser power is strong enough to increase the local temperature of the etching liquid. In some other embodiments, the laser beam can be focused proximate the taper tip 308 without necessarily being propagated along the optical fiber 302. For instance, two-photon excitation or other alternative and equivalent excitation techniques can be used to focus a laser beam proximate the taper tip 308 while it is immersed into the etching liquid 316. Theoretically, localized heating using resistive wires or other electrical heating techniques can be envisaged.

At step 208, the heating of the etching liquid 316 causes a corresponding etching gradient 322 in which etching rate increases longitudinally from the tapered region 306 towards the taper tip 308. The etching gradient 322 results in the shaping of the taper tip 308 to form a lens 310. Specifically, in some embodiments, the etching rate of increasing aggressiveness towards the taper tip 308 etches the taper tip 308 into a round tip **308*a* forming the lens 310. Reference is now made to FIG. 3C arrows A and B which depict the increasing temperature gradient 320 and the etching rate gradient 322 which are both maximal or near-maximal proximate the taper tip 308**, as further discussed below.

Figures 4A, 4B:
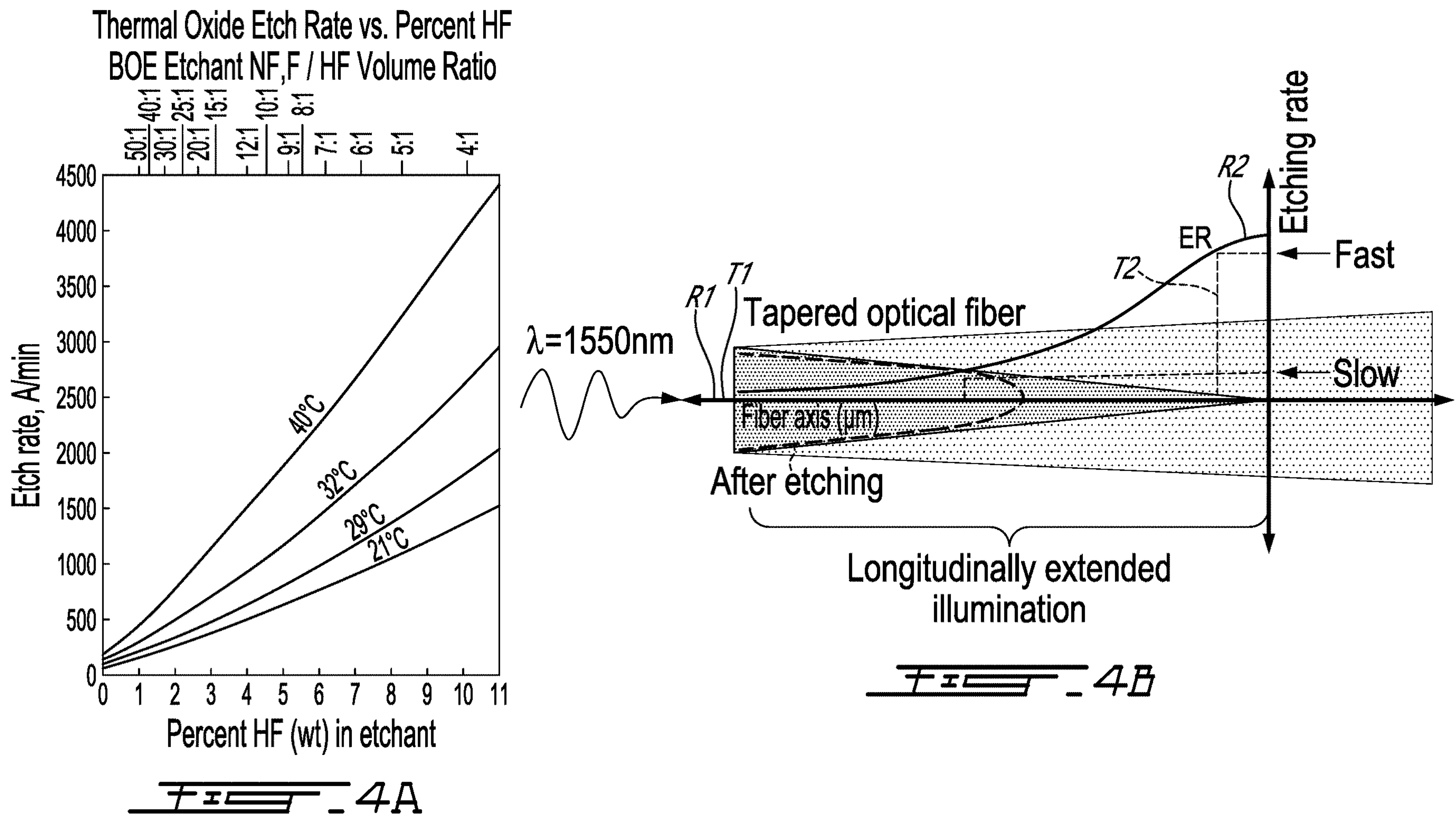
FIG. 4A is an example graph showing etching rate as a function of etching liquid concentration for different temperatures, in accordance with one or more embodiments.
FIG. 4B is an example graph showing etching rate as a function of distance from a taper tip immersed into an etching liquid heated in accordance with a temperature gradient, in accordance with one or more embodiments.

As shown in FIG. 4A, the etching rate of a given etching liquid of a given concentration, in this case HF, tends to increase proportionally with temperature. Accordingly, it was found that by heating the etching liquid surrounding the taper tip with a temperature gradient, the etching rate of the surrounding etching liquid would follow a corresponding gradient. As shown in FIG. 4B, as the temperature of the etching liquid increases from a first temperature value T1 proximate the tapered region to a second temperature value T2 proximate the taper tip, the etching rate correspondingly increases from a first etching rate R1 proximate the tapered region to a second etching rate R2 proximate the taper tip. For clarity, in this embodiment, the second temperature T2 is greater than the first temperature T1, and the second etching rate R2 is greater than the first etching rate R1.

FIG. 5 shows an example of a system 500 for manufacturing a lensed optical fiber according with an embodiment of the method 200. As shown, the system 500 has a laser beam source 530 configured for emitting a laser beam 534 which can be delivered via a beam delivery cable 532. As shown, the beam delivery cable 532 is optically coupled to a distal end **502*a* of the optical fiber 502 so that the laser beam is propagated inside the optical fiber 502 towards the tapered region 506 and ultimately reaching the taper tip 508. In some other embodiments, the beam delivery cable can be spliced or otherwise optically coupled to the distal end of the optical fiber. For instance, a free-space laser source and collimator assembly can be used to couple the laser beam into the fiber. Alternatively, a fiber mating sleeve and a temporary connector can be used as well for the optical coupling. As depicted, the system 500 includes a container 518 receiving the etching liquid 516 and an organic layer 517. The organic layer 517 may help prevent etching liquid to reach, and possibly damage, the rest of the optical fiber. The organic layer 517 may be provided in the form of a liquid, for instance, isooctane or other suitable organic liquids. As shown, the container 518 has an open top 518*a* covered by the organic layer 517 through which the optical fiber 502 can be lowered or the container 518 can be lifted to immerse the taper tip 508 and the tapered region 506 of the optical fiber 502 therein. The laser beam source 530 can be activated prior, during or after the optical fiber 502 has been lowered into the etching liquid 516**, depending on the embodiment.

FIG. 6A shows a map showing a simulated distribution of optical energy as the laser beam reaches the tapered region 506 and taper tip 508 which, thanks to the decreasing dimension of the taper tip 508, gradually focus the laser beam and cause an optical energy density increase at the taper tip 508. FIG. 6B shows a simulated heat map showing how the absorption of the optical energy from the fiber tip by water shown in FIG. 6A influences the temperature of the surrounding liquid. Based on the temperature and etching profiles of FIGS. 6C and 6D, it was found that by heating the taper tip 508, and more specifically the etching liquid surrounding the taper tip 508, a temperature gradient is created which then causes a corresponding etching rate gradient. As such, when the taper tip 508 is locally heated with such a continuous temperature gradient, the resulting continuous etching rate gradient can thus etch the taper tip 508 at a greater rate than the rest of the optical fiber, thereby forming a rounded tip acting as a lens.

It is noted that the optical fiber can be made of any suitable type of material. For instance, the optical fiber may be made of silica-based glass, low phonon energy glass and the like. In these embodiments, the etching liquid may be tuned to the type of glass of the optical fiber. Correspondingly, the laser beam source and associated laser beam can be tuned for proper propagation through the type of glass pertaining to the optical fiber. Moreover, the etching liquid is chosen so that its absorption window matches at least partially a transmittance window of the optical fiber's glass.

Figure 8:
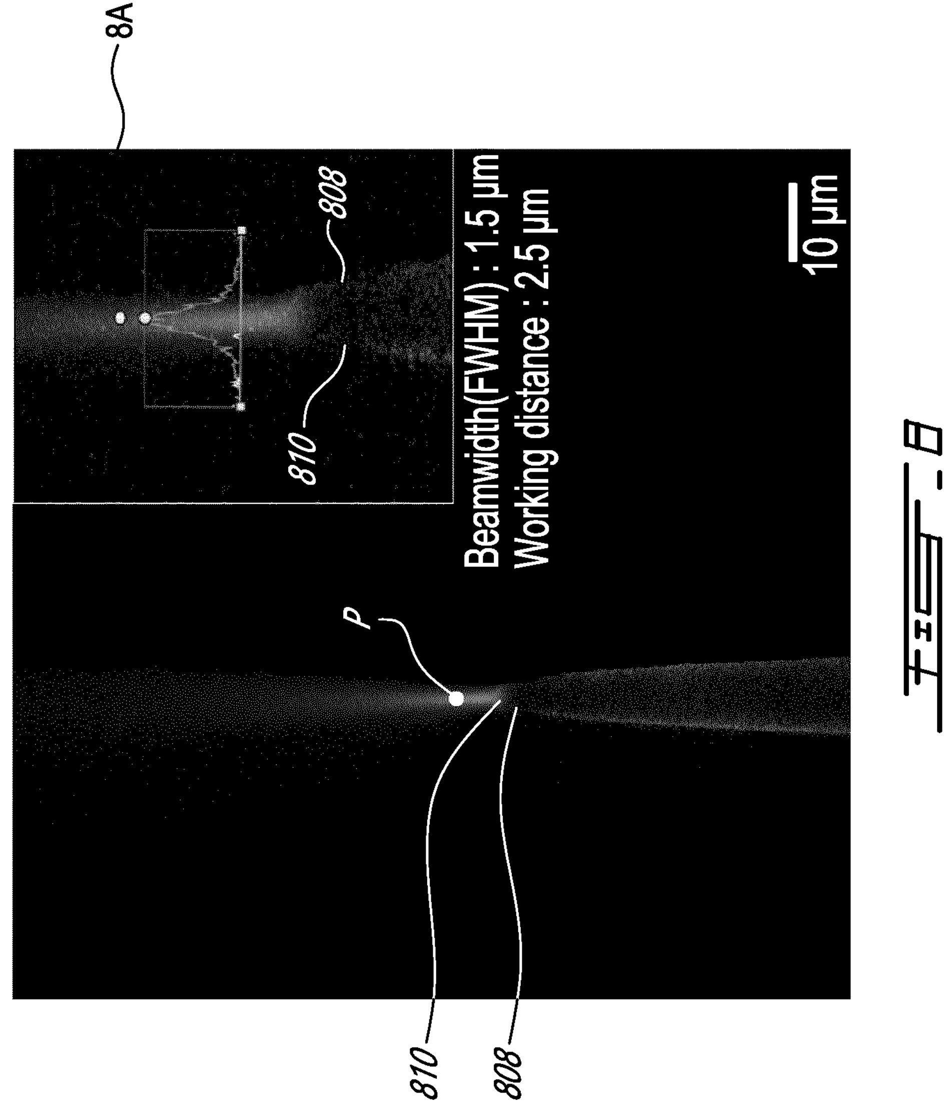
FIG. 8 is an example of a beam profile outputted at a rounded tip of a lensed optical fiber taper, in accordance with one or more embodiments.

FIG. 7A shows an optical image of the optical fiber 502, prior to the immersion into the etching liquid. FIG. 7B shows a rounded taper tip 508 resulting from the method described herein, with FIG. 7C showing an enlarged view thereof. One may appreciate the continuous rounding of the taper tip in FIGS. 7B and 7C which is typically interesting when a focusing lens is desired. As shown, the tapered region 506 has a taper angle α and the rounded tip 508 has a tip radius β. In some embodiments, the taper angle α can range between about 15 degrees to about 1 degree, preferably between about 10 degrees to about 2 degrees and most preferably between about 5 degrees to about 3 degrees. The tip radius β can range between about 15 to the sub-micron range, preferably between about 10 microns to 2 microns and most preferably between about 5 microns to about 3 microns. Other values for the taper angle and/or the tip radius can be provided depending on the embodiment. Such values for the taper angle α and the tip radius β were found to be out of reach of conventional lensed optical fiber manufacturing techniques. As such, the method described herein can advantageously provide a taper angle of reduced dimension, which may be more easily inserted into biological tissue (perhaps causing less damage), while provide a tip radius β providing enlightening focusing or beam shaping performances. FIG. 8 shows an example of a lens optical fiber taper made according to the method described herein. As shown, the rounded tip can output a focused beam of light, a beam profile of which is better shown at inset 8A. More specifically, the lens 810 is a focusing lens 810 focusing the light beam towards a point P spaced away from the rounded tip 808. It is noted that a volume of illumination of the lens 810 can be changed on the go. More specifically, the lens 810 can be used to switch illumination from a focused beam to a divergent beam, or vice versa. In these embodiments, the switching between the focused beam and divergent beam can be performed by modifying the angle at which the optical signal is injected into the other end of the optical fiber taper. The lensed optical fiber described herein can provide a significant increase in terms of collection efficiencies and/or in terms of illumination efficiencies. Moreover, the signal-to-noise ratio can be increased in the axial and lateral directions due to the shape of the rounded tip.

Figures 9A, 9B, 9C, 9D:
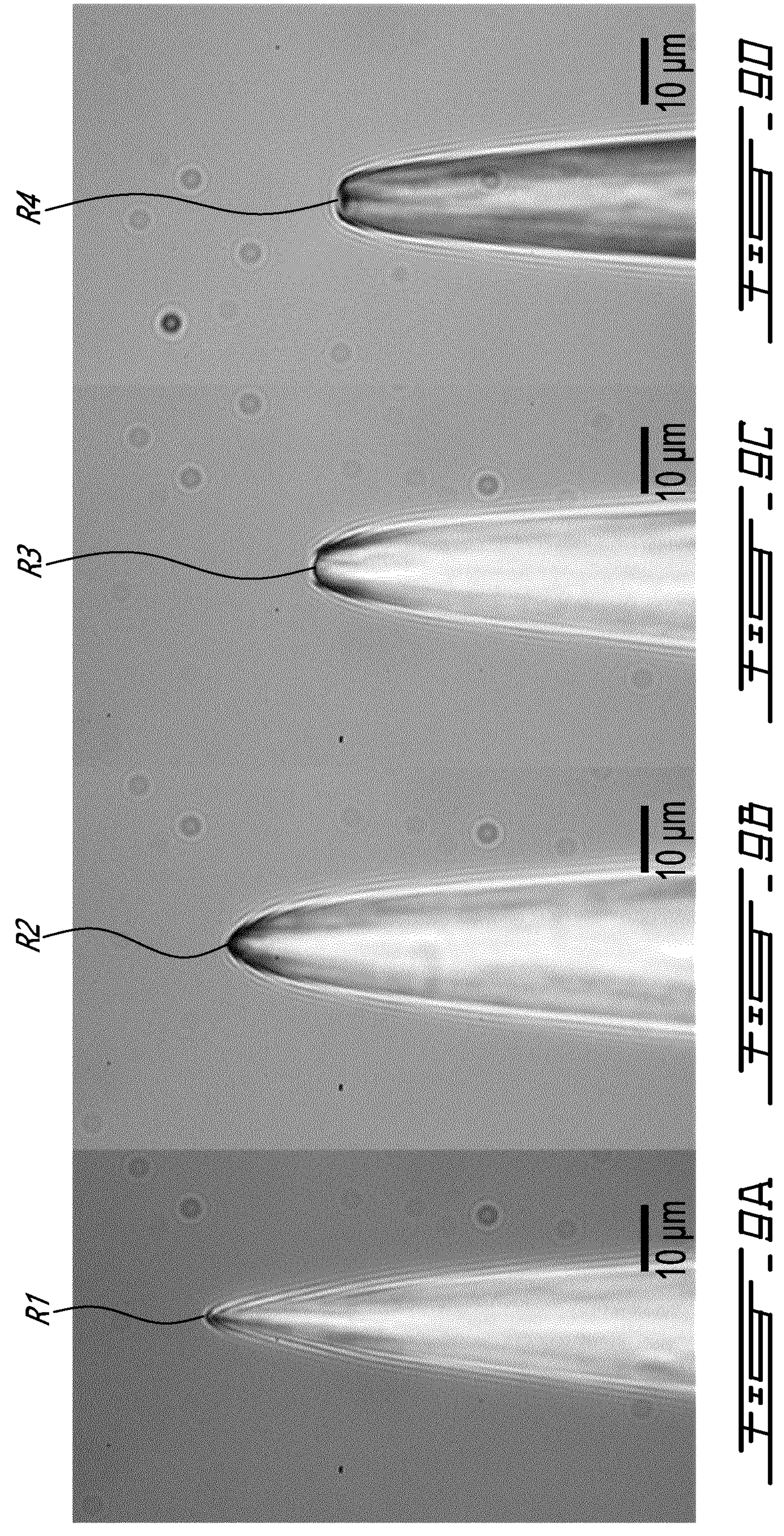
FIGS. 9A, 9B, 9C and 9D are enlarged views of taper tips of lensed optical fiber tapers formed using increasing laser power values, in accordance with one or more embodiments.

FIGS. 9A through 9D show that by increasing the laser power, one may tune the shape of the resulting lens. As shown, FIG. 9A shows a convex lens of a first radius (below about 1 μm) of curvature when heated with a laser beam of a first power value of 180 mW, FIG. 9B shows a convex lens of a second radius of curvature (about 1.7 μm) when heated with a laser beam of a second power value of 190 mW, FIG. 9C shows a convex lens of a third radius of curvature (about 3.5 μm) when heated with a laser beam of a third power value of 200 mW and FIG. 9D shows a concave lens when heated with a laser beam of a fourth power value of 250 mW. Accordingly, it is expected that the type of lens can be controlled based on the amount of heat provided to the taper tip, in this case the amount of laser power. Depending on the embodiment, a concave lens, a convex lens, an axicon lens, a circular lens, an oval lens, a groove shaped lens and the like can be formed at the taper tip. For instance, the lenses of FIGS. 9A and 9B have parabolic shapes, the lens of FIG. 9C has a spherical shape and the lens of FIG. 9D has a concave shape. In some embodiments, the laser power value is increased over a given laser power threshold, with the laser power threshold being associated to at least one of an etched taper angle and an etched tip radius. Accordingly, by selecting a desired taper angle, a desired tip radius, or a desired combination thereof, one may retrieve the laser power threshold from reference data, for instance. The aforementioned laser power values to fabricate a specific fiber tip structure may vary depending on fiber material, the core diameter of the fiber, taper angle, environmental temperature, the type of laser used, and the concentration of the etchant, to name only a few variables.

In some embodiments, a lensed optical fiber taper made according to the method described herein can have recognizable characteristics. As mentioned above, such recognizable characteristics can include, but are not limited to, a taper angle below about 3 degrees, a tip radius below about 3 microns. Moreover, in some embodiments, the lensed optical fiber taper has, at the taper tip, at least a discernable and continuous interface between a core of the optical fiber and a cladding surrounding the core of the optical fiber. Such a discernable and continuous interface can be indicative that the manufacturing of the lensed optical fiber taper did not involve melting, which would blur the interface between the optical fiber constituents (e.g., core, inner cladding, outer cladding). In some other embodiments, one may detect a lensed optical fiber taper made with the method described herein by measuring, at a center region of the rounded tip, a refractive index and comparing it to a refractive index of a core of the optical fiber. As such, if the comparison indicates that the refractive index of the center region of the rounded tip substantially corresponds to the refractive index of the core of the optical fiber, one may determine that no melting was involved in the manufacture of the lensed optical fiber taper. In some embodiments, one may detect a lensed optical fiber taper made with the method described herein by measuring a roughness value indicative of a roughness of the outer surface of the lens. For instance, if the measured roughness value lies between a first roughness value substantially corresponding to roughness of a melted optical fiber and a second roughness value substantially corresponding to roughness of a mechanically grinded optical fiber, then it may be assumed that the lensed optical fiber taper has been made using the etching method described herein.

Figure 10B:
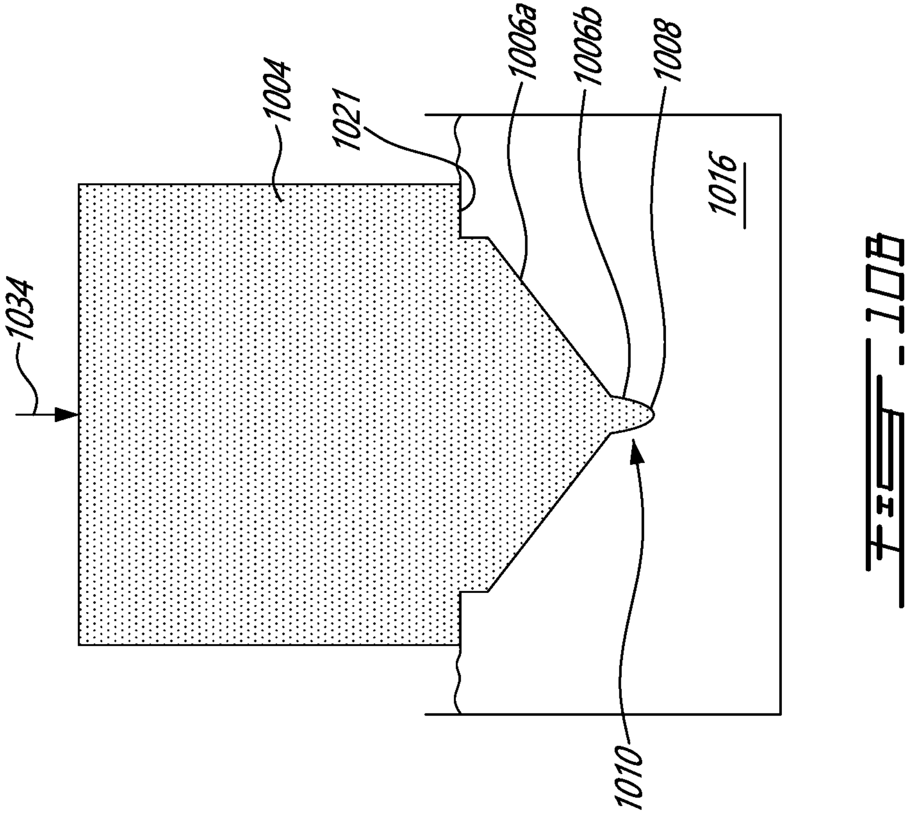
FIG. 10B is a side view of the tapered optical fiber of FIG. 10A with the second tapered region and the taper tip processed to form a lens, in accordance with one or more embodiments.
Figure 10A:
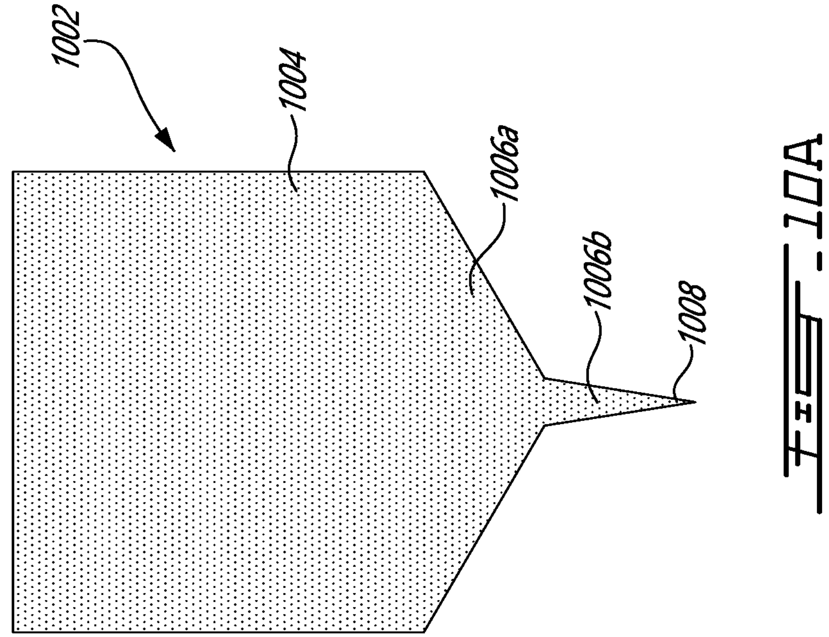
FIG. 10A is a side view of an example of a tapered optical fiber having in succession a first tapered region, a second tapered region and a taper tip, in accordance with one or more embodiments.

As some embodiments, such as the one shown in FIG. 10A, there is provided an optical fiber 1002 having in succession at least an optical fiber body 1004, a first tapered region **1006*a*, a second tapered region 1006*b* extending from the first tapered region 1006*a* and a taper tip 1008. In this embodiment, the first tapered region 1006*a*, the second tapered region 1006*b* and the taper tip 1008 are immersed into an etching liquid 1016. This may form a shoulder 1021 between the first tapered region 1006*a* and the remainder of the optical fiber body 1004. The heat created by the emitted light at the tip of the second tapered region 1006*b* increases the local temperature, and consequently forms the lens 1010, leaving the first tapered region 1006*a* relatively unetched. It was found useful to provide a first tapered region 1006*a* with a short length in some embodiments, at least to provide increase stability and strength for the lens 1010**.

Figure 11B:
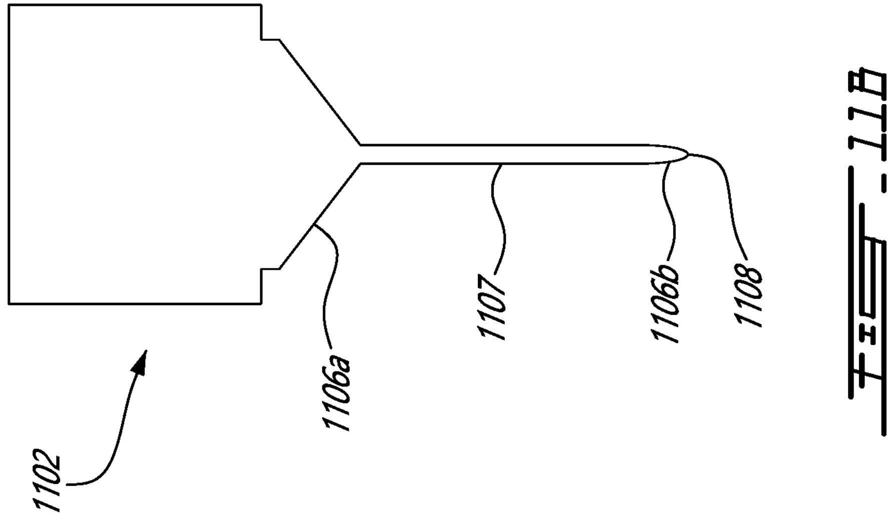
FIG. 11B is a side view of elongated tapered optical fiber of FIG. 11A with the second tapered region and the taper tip processed to form a lens, in accordance with one or more embodiments.
Figure 11A:
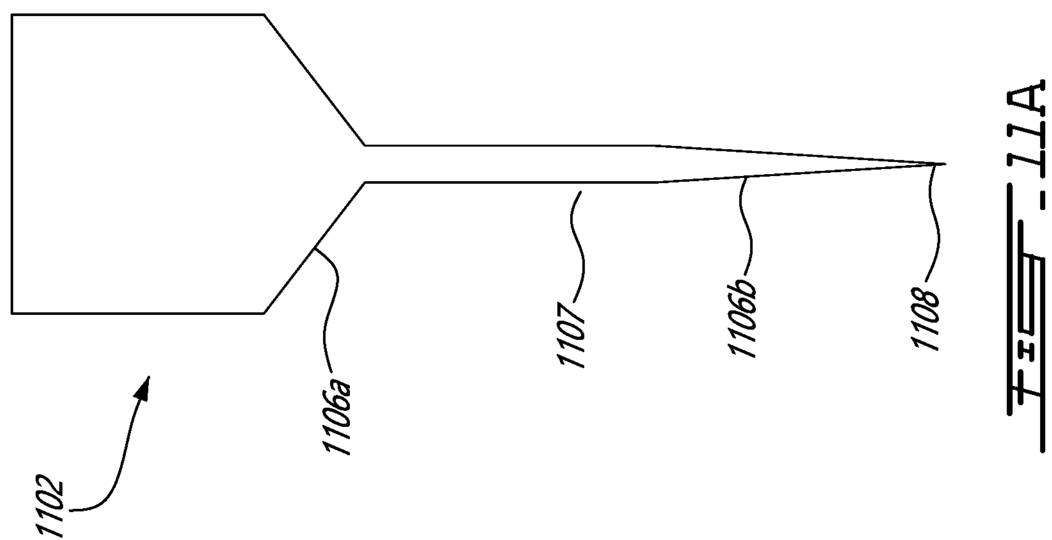
FIG. 11A is a side view of an example of an elongated tapered optical fiber having in succession a first tapered region, a neck region, a second tapered region and a taper tip, in accordance with one or more embodiments.

FIG. 11A is a side view of an example of an elongated tapered optical fiber 1102. As shown, the elongated tapered optical fiber 1102 has in succession a first tapered region **1106*a*, a neck region 1107, a second tapered region 1106*b* and a taper tip 1108. The neck region 1107 generally has a constant diameter, or a slightly varying diameter, along its length. Such a neck region 1107 is generally provided in applications where an elongated and/or thin aspect in the tapered optical fiber is sought after. The heat created by the emitted light at the taper tip 1108 of the second tapered region 1106*b* increases the local temperature, and consequently forms the lens as shown in FIG. 11B. In this embodiment, the etching can reduce the diameter of the neck region 1107 in an evenly manner as there is little or no temperature gradient proximate to the neck region 1107**. In some other embodiments, the temperature gradient reaches the neck region and thus can taper its diameter during the heating step.

Figures 12, 13:
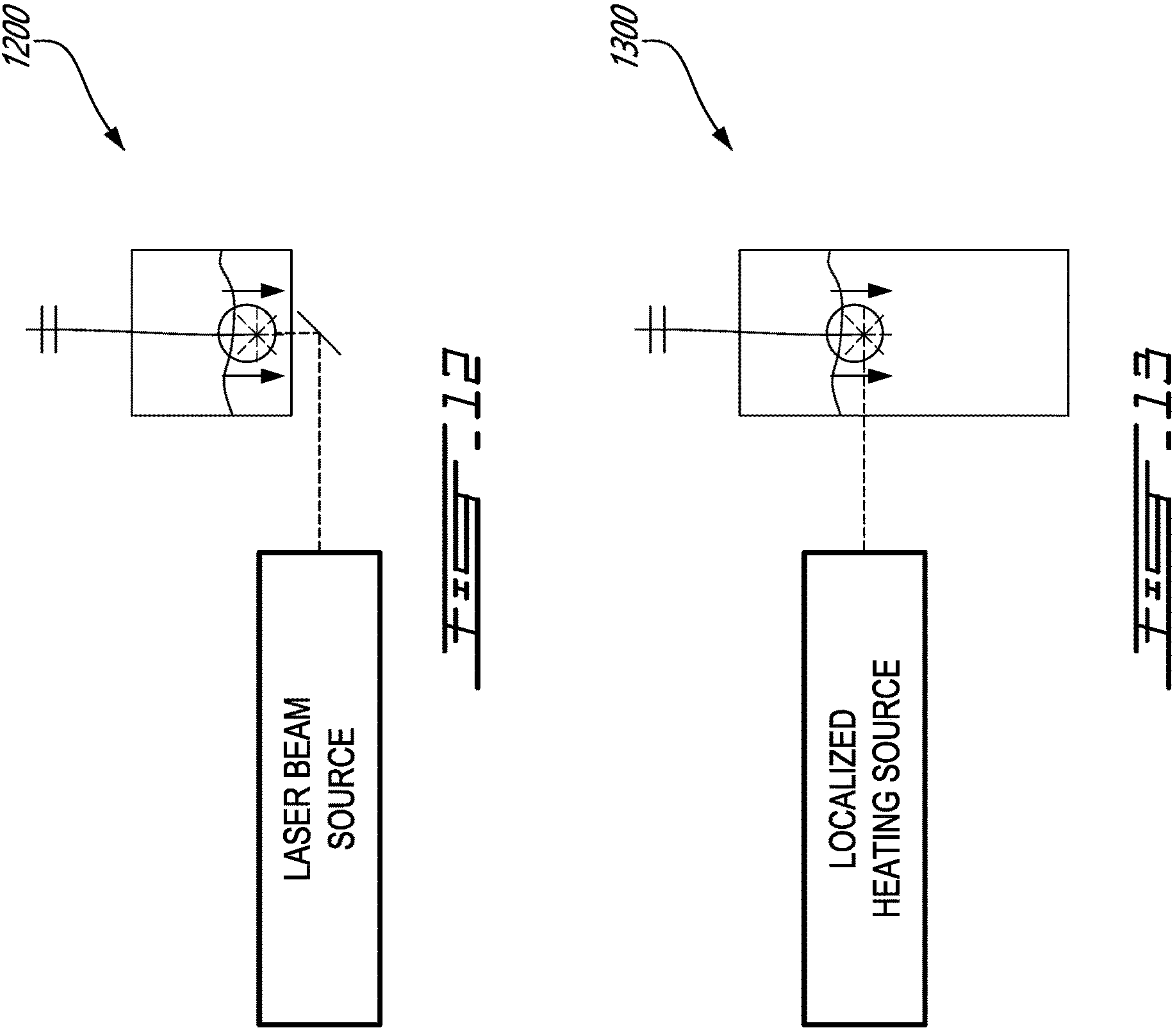
FIG. 12 is a schematic view of an example of a system for manufacturing a lensed optical fiber, showing a laser beam source propagating a laser beam at a taper tip of a tapered optical fiber, in accordance with one or more embodiments.
FIG. 13 is a schematic view of an example of a system for manufacturing a lensed optical fiber, showing a localized heating source heating the etching liquid in accordance with a temperature gradient, in accordance with one or more embodiments.

FIG. 12 shows an example of a system 1200 for manufacturing a lensed optical fiber according with an embodiment of the method 200. In the system a laser beam source is delivered to the taper tip across the container wall, for instance. As shown, it may be preferable to guide the laser beam from the bottom of the container, or at least along a longitudinal orientation of the taper, to achieve a symmetric temperature gradient. To do so, the laser beam has a focal spot directed at the taper tip, thereby causing the temperature gradient and the corresponding etching rate gradient. For instance, in some embodiments, two-photon excitation using visible light to create ultraviolet light at a focal point proximate the taper tip can be envisaged. In these embodiments, the position of the focal may be moved along the length of the optical fiber to create a suitable temperature gradient. In some embodiments, it was found preferred to place the taper tip proximate the bottom of the container, and with the laser beam focused on the taper tip. When the laser beam is in the near-infrared (NIR) or mid-infrared region (MIR) of the electromagnetic spectrum, the container first preferably has a high transmission at the NIR and/or MIR and be non-reactive with the etchant. In some embodiments, the optical fiber is moved as its tip is being etched in the heated etching liquid.

FIG. 13 shows an example of a system 1300 for manufacturing a lensed optical fiber according with an embodiment of the method 200. As shown, the system has a localized heating source heating the etching liquid surrounding the taper tip. Examples of such localized heating sources can include, but not limited to, an electrical heater having a heating member extending within the etching liquid, and other examples. Although embodiments involving an electrical heater may face challenges in terms of creating a suitable temperature gradient and/or in sustaining etching damages from the etching liquid, it is believed that present (unknown to the inventors at this point) or future technical advances or discoveries may pave the way to achieve such workable embodiments.

Figure 14:
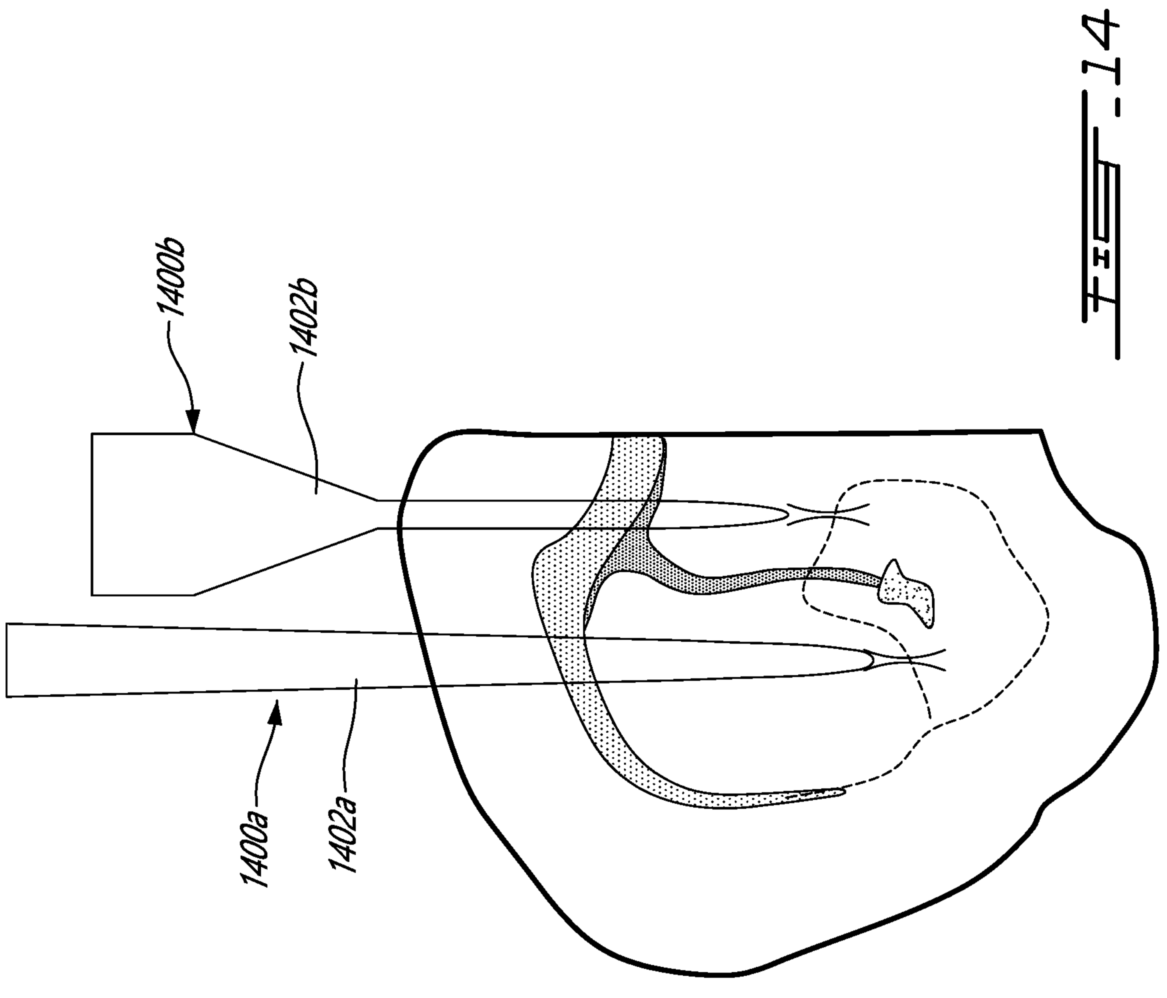
FIG. 14 is a schematic view of examples of biological tissue probes each incorporating a different lensed optical fiber taper, in accordance with one or more embodiments.

The lensed optical fiber as the ones described above can be used in different applications. The following paragraphs present some of these applications as examples only. FIG. 14 shows examples of biological tissue probes **1400*a* and 1400*b* incorporating a lensed optical fiber taper 1402*a* and an elongated optical fiber taper 1402*b*, respectively. As shown, the lensed optical fiber tapers 1402*a* and 1402*b* are used to illuminate and/or interrogate biological tissue such as brain tissue. As the taper angle is relatively small, the damage incurred to the brain tissue is kept minimal. Moreover, thanks to the small tip radius as well light can be efficiently focused or collected using the lensed optical fiber tapers 1402*a* and 1402*b***. It is intended that such biological tissue probes can have an enhanced detection efficiency and be cheaper to produce. Such biological tissue probes are discussed in at least some scientific publications including, but not limited to, Pisanello, F., Mandelbaum, G., Pisanello, M., Oldenburg, I. A., Sileo, L., Markowitz, J. E., . . . & Sabatini, B. L. (2017). Dynamic illumination of spatially restricted or large brain volumes via a single tapered optical fiber. *Nature neuroscience,* 20 (8), 1180-1188, the contents of which are hereby incorporated by reference. It is noted that, in some embodiments, the lensed optical fiber taper **1402*b* can have a thin elongated shape so as to be as minimally invasive as possible during a surgery. In these embodiments, the thin elongated shape of the lensed optical fiber taper 1402*b* can facilitate insertion into biological tissue. This can in turn reduce the amount of damage after the surgery. In some embodiments, the manufacture of the lensed optical fiber taper 1402*b*** can include more than one step of tapering the optical fiber. Each tapering step can be applied to different sections of the optical fiber to make it gradually thinner and thinner leading to the rounded tip. In these embodiments, the steps of immersing the taper tip into the etching liquid and heating the heating liquid can be performed before or after the other steps of tapering the optical fiber, depending on the embodiment.

Figure 15:
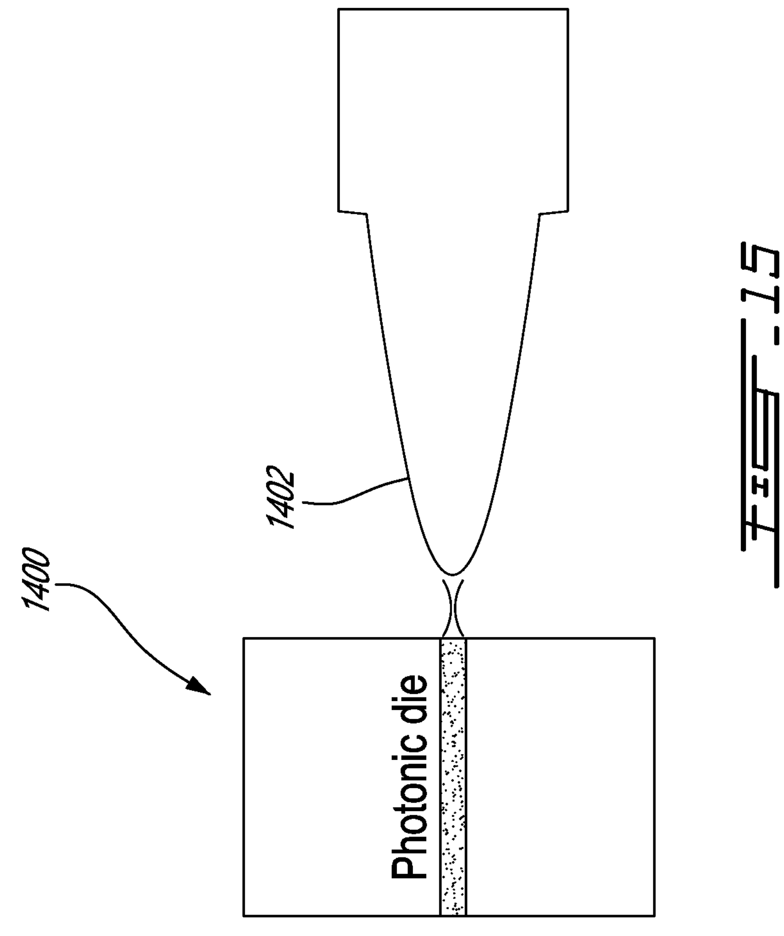
FIG. 15 is a schematic view of an example of a photonic-integrated circuit incorporating a lensed optical fiber taper, in accordance with one or more embodiments.

FIG. 15 shows an example of a photonic-integrated circuit (PIC) 1500 incorporating a lensed optical fiber taper 1502. As shown, the lensed optical fiber taper 1502 is used to transmit and/or receive communication signals to and from PIC inputs and/or outputs. Thanks to the small tip radius, communication signal(s) can be efficiently transmitted or received using the lensed optical fiber taper 1502. It is envisaged that the high demand in terms of microlensed fibers can be met by batch fabrication of the lensed optical fiber taper 1502 at low production cost using the method described herein. In some embodiments, having tip radii between 3 microns and 5 microns is preferred in PIC applications.

Figure 16:
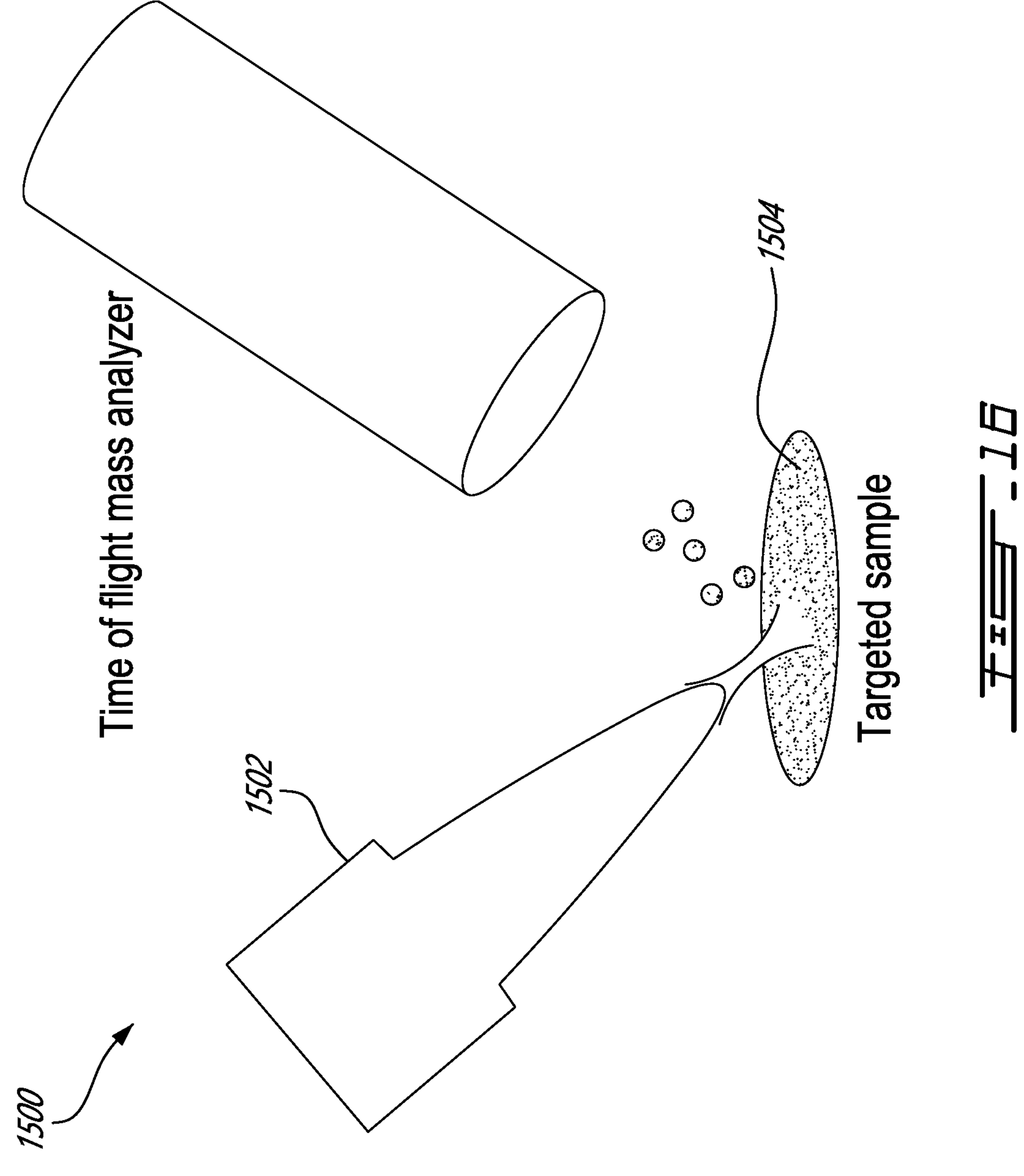
FIG. 16 is a schematic view of an example of a mass spectrometer capillary incorporating a lensed optical fiber taper, in accordance with one or more embodiments.

FIG. 16 shows an example of a mass spectrometer 1600 incorporating a lensed optical fiber taper 1602. As shown, the lensed optical fiber taper 1602 is used to illuminate tissues 1604 to be interrogated. Such mass spectrometers are discussed at least in some scientific publications including, but not limited to, Meng, Y., Ma, S., Zhang, Z., & Hang, W. (2020). 3D Nanoscale Chemical Imaging of Core-Shell Microspheres via Microlensed Fiber Laser Desorption Postionization Mass Spectrometry. *Analytical Chemistry,* 92 (14), 9916-9921; and Meng, Y., Cheng, X., Wang, T., Hang, W., Li, X., Nie, W., & Yan, X. (2020). MicroLensed Fiber Laser Desorption Mass Spectrometry Imaging Reveals Subcellular Distribution of Drugs within Single Cells. *Angewandte Chemie,* 132 (41), 18020-18027, the contents of which are hereby incorporated by reference.

Figure 17:
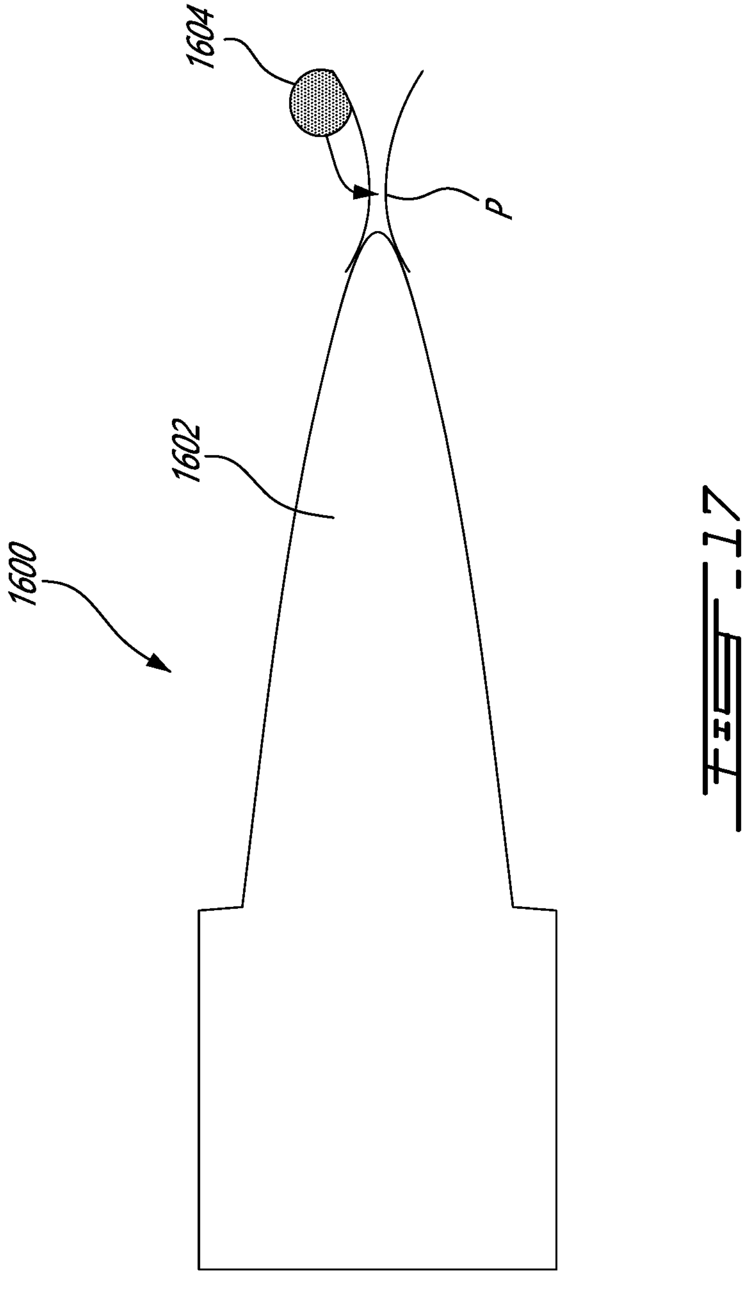
FIG. 17 is a schematic view of an example of an optical tweezer incorporating a lensed optical fiber taper, in accordance with one or more embodiments.

FIG. 17 shows an example of an optical tweezer 1700 incorporating a lensed optical fiber taper 1702. As shown, the lensed optical fiber taper 1702 is used to capture a molecule or cell 1704 at a focal point P of the lens.

As can be understood, the examples described above and illustrated are intended to be exemplary only. For instance, any type of optical fiber can be used. Examples of such optical fiber include, but not limited to, single-mode optical fiber, multi-mode optical fiber, multi-core optical fibers, polarization-maintaining optical fiber, and the like. The scope is indicated by the appended claims.

What is claimed is:

1. A method of manufacturing a lensed optical fiber using an optical fiber having a tapered region decreasing in diameter along a longitudinal direction leading to a taper tip, the method comprising:

while the tapered region and the taper tip of the optical fiber are immersed into an etching liquid, heating the etching liquid surrounding the taper tip in accordance with a temperature gradient in which temperature increases longitudinally from the tapered region to the taper tip, said heating causing a corresponding etching rate gradient shaping the taper tip into a lens.

2. The method of claim 1 wherein the etching liquid absorbs light within an absorption spectral range, said heating being performed using a laser beam having optical energy distributed at least partially in the absorption spectral range of the etching liquid.

3. The method of claim 2 wherein heating includes injecting the laser beam within the optical fiber, and propagating the laser beam along the longitudinal orientation towards the taper tip.

4. The method of claim 2 further increasing a laser power of the laser beam over a given laser power threshold, the laser power threshold being associated to at least one of an etched taper angle and an etched tip radius.

5. The method of claim 2 wherein the etching liquid includes hydrofluoric acid and the laser beam is a near-infrared laser beam.

6. The method of claim 1 wherein the lens has an etched taper angle below about 10 degrees and an etched tip radius below about 10 microns.

7. The method of claim 1 wherein said etching includes rounding the taper tip to form a rounded tip.

8. The method of claim 7 wherein the rounded tip is one of hemispherical, parabolic and hyperbolic in shape.

9. The method of claim 1 wherein the tapered region has in succession at least a first tapered region, a second tapered region extending from the first tapered region, and the taper tip, said heating including heating at least the second tapered region and the taper tip.

10. The method of claim 9 wherein said first tapered region has a greater taper angle than a taper angle of the second tapered region.

11. A method of manufacturing a lensed optical fiber, the method comprising: providing an optical fiber having a tapered region decreasing in diameter along a longitudinal direction and leading to a taper tip; and while the tapered region and the taper tip of the optical fiber are immersed into an etching liquid, heating the etching liquid surrounding the taper tip in accordance with a temperature gradient in which temperature increases longitudinally from the tapered region to the taper tip.

* * * * *